J. P. HAYES.
Domestic Oven.
No. 6,063. Patented Jan'y 30, 1849.
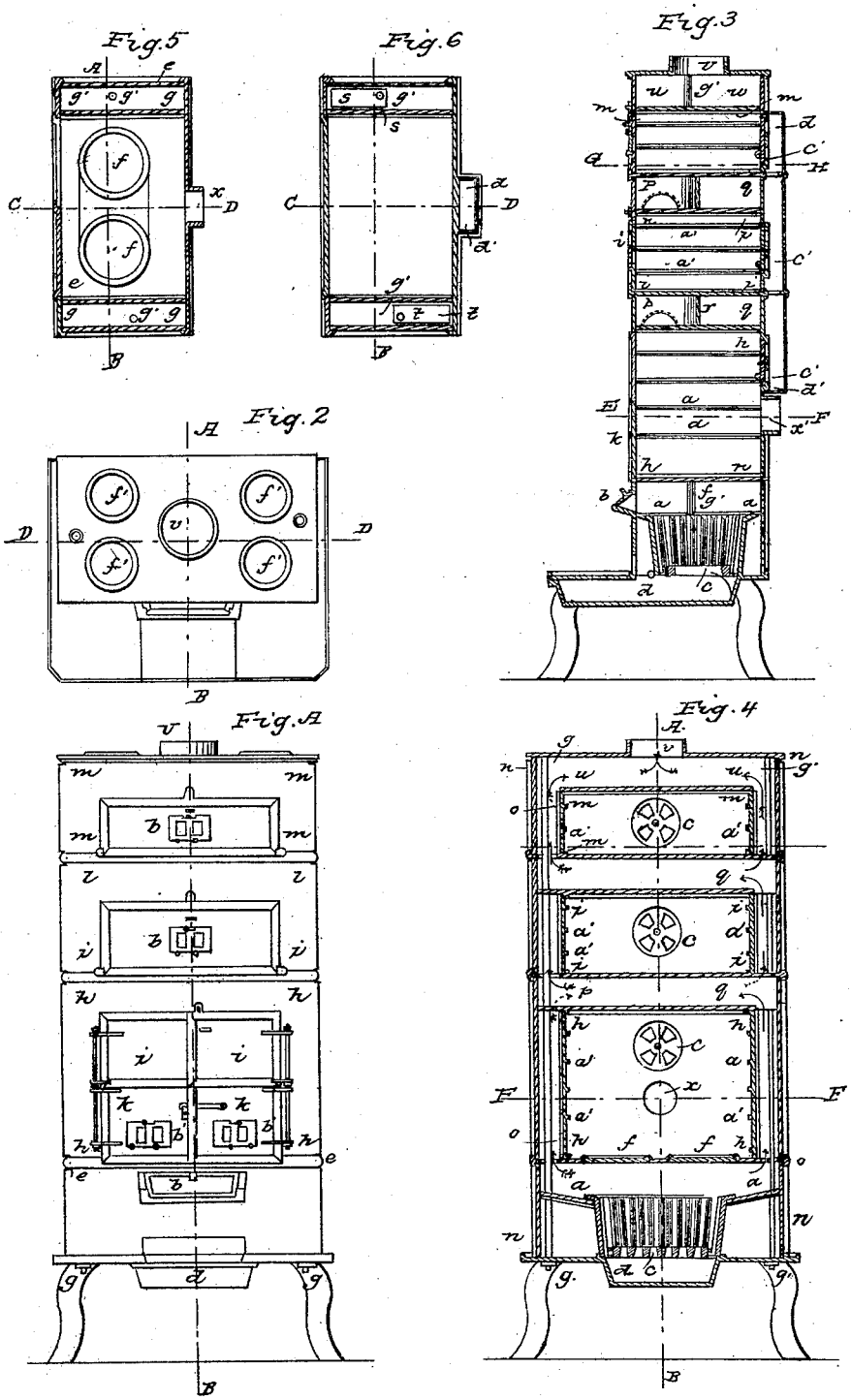

UNITED STATES PATENT OFFICE.

JOHN P. HAYES, OF BOSTON, MASSACHUSETTS.

IMPROVEMENT IN BAKING APPARATUS.

Specification forming part of Letters Patent No. 6,063, dated January 30, 1849.

*To all whom it may concern:*

Be it known that I, JOHN P. HAYES, of Boston, in the county of Suffolk and State of Massachusetts, have invented a new and useful Baking or Cooking Apparatus; and I do hereby declare that the following description, taken in connection with the accompanying drawings, hereinafter referred to, forms a full and exact specification of the same, wherein I have set forth the nature and principles of my said invention, by which it may be distinguished from others of a similar class, together with such parts as I claim and desire to have secured to me by Letters Patent.

The figures of the accompanying plate of drawings represent my new cooking apparatus.

Figure 1 is a front elevation, and Fig. 2 is a plan of the same. Fig. 3 is a central transverse vertical section taken in the plane of the line A B, Figs. 1, 2, 4, 5, and 6. Fig. 4 is a vertical section taken in the plane of the line C D, Figs. 2, 5, and 6; and Figs. 5 and 6 are horizontal sections taken in the planes of the lines E F and G H, respectively. (See Figs. 3 and 4.)

My design in devising my aforesaid new cooking apparatus was to secure an arrangement of several parallel cooking or baking apartments one above the other, and so combined with the fire-chamber as to provide for cooking meat, bread, and other articles requiring a large amount of heat to penetrate through them in the apartment immediately over the fire-chamber, while in the upper apartments cake and pastry may be thoroughly baked by carrying the smoke, &c., entirely around them in a manner which will be explained in the sequel.

$a$ $a$, Figs. 3 and 4, is the fire-chamber, properly lined, as shown in said figure, and having a supplying-mouth at $b$, Figs. 1 and 3, a grate $c$, and ash-pit $d$ beneath said grate. This fire-chamber is covered with the horizontal plate $e$ $e$, arranged with proper holes (and covers) for boiling-spaces, as shown at $f$ $f$, and having the rectangular openings $g$ $g$ $g$ $g$—one on each side—for the passage of the smoke, &c., as shown in Figs. 4 and 5. Over this plate $e$ $e$ is arranged the large cooking-chamber $h$ $h$ $h$ $h$, for cooking meat, &c., having two sets of doors $i$ $i$ $k$ $k$, as shown in the drawings. The sides of this apartment, as well as those of the two baking-chambers $l$ $l$ $l$ $l$ $m$ $m$ $m$ $m$, are placed at a proper distance from the exterior side plates $n$ $n$ $n$ $n$ of the apparatus, so as to provide a proper flue-space to the top of the same, as shown at $o$ $o$ $o$ $o$, Fig. 4. The two baking-chambers $l$ $l$ $l$ $l$ $m$ $m$ $m$ $m$ are arranged one above the other, the former-named being above the chamber or apartment $h$ $h$ $h$ $h$, and these several chambers are separated from each other by the horizontal flue-spaces $p$ $q$ $p$ $q$, Figs. 3 and 4. These horizontal flues are divided in a transverse direction by the vertical plates $r$ $r$, Fig. 3, extending from side to side of the apparatus, and said horizontal flues communicate with the vertical flues $o$ $o$ $o$ $o$ first at the front corner of the apparatus and then at the back corner diagonally opposite to this front corner, and so on, the communication being through the rectangular spaces $s$ $s$ and $t$ $t$, formed in the top and bottom plates of the chambers $h$ $h$ $h$ $h$ $l$ $l$ $l$ $l$ $m$ $m$ $m$ $m$, as shown in Fig. 6, which plates extend from side to side of the apparatus and with the plates $r$ $r$ divide the flues $o$ $o$ $o$ $o$, making the smoke pass from a portion of one to a portion of the other through the horizontal flues $p$ $q$ $p$ $q$, as explained below. The flues thus arranged may be considered as two continuous right-angular flues, and the route of the smoke through one of them is entirely distinct from that in the other, and the two currents constantly traverse in contrary directions by each other (on opposite sides of the plates $r$ $r$) until they arrive at the upper horizontal flue $u$ $u$, Figs. 3 and 4, where they combine, and are then discharged through the pipe $v$. In other words, the smoke in one flue passes up on the right side of the chamber $h$ $h$ $h$ $h$, then horizontally over the same in front of the lower partition-plate $r$, then up a little on the left side of the lower oven $l$ $l$ $l$ $l$, through one of the openings $t$ $t$ at the back corner of the apparatus and horizontally behind the upper vertical plate $r$, then up again on the right side of the upper oven $m$ $m$ $m$ $m$ into the flue $u$ $u$, where it meets the smoke from the other right-angular flue, which has passed in the opposite direction and on the other sides of the said vertical plates $r$ $r$, the route in the two flues being indicated by full black arrows when the smoke passes in front of the plates $r\ r$ and by dotted black arrows when it passes behind the same, and the smoke, &c., passing by this arrangement around each oven-chamber.

Each of the baking-chambers and the lower cooking-chamber are provided with suitable ledges cast on the interior of the side plates of the same, as shown in Figs. 3 and 4 at $a'\ a'\ a'$, for the support of slides, pans, &c., and said lower chamber has a circular hole $x'$ at the back for the escape of the steam, &c. Said chambers are also provided with sliding registers $b'\ b'\ b'\ b'$ in their respective doors, as shown in Fig. 1, and turning registers $c'\ c'\ c'$ in their backs, which latter communicate with the vertical rectangular hollow shaft $d'\ d'$, closed at the top and bottom and arranged on the back of the apparatus, as shown in Figs. 3 and 6, which several registers, &c., may be so operated as to effectually ventilate the ovens or to carry the redundant heat from one to the other, as the case may require.

Several boiling-spaces $f'\ f'\ f'\ f'$ are formed in the top plate of the apparatus over the flue-space $u\ u$, which enhance the cooking capacity of the apparatus.

The several plates of the apparatus are framed together in the usual way, and are confined in position after being fitted by the rods and nuts shown at $g'\ g'\ g'\ g'$, Figs. 1, 3, 4, 5, and 6.

It will be evident that other baking-chambers may be added above those described and the smoke-flues continued around them substantially on the principle I have herein set forth, the only limit to such extension being that where all the heat has been extracted or radiated from the smoke, &c.

Having thus described my improvements, I shall state my claims as follows:

What I claim as my invention, and desire to have secured to me by Letters Patent, is—

1. A cooking or baking apparatus having several parallel baking-chambers with divided horizontal flue-spaces between them communicating with vertical flue-spaces on each side of them, substantially as hereinabove described, and so as to make the smoke, &c., pass around said chambers, as above set forth.

2. Connecting said chambers with each other by the combination of the turning registers $c'\ c'\ c'$ in their backs with the vertical hollow shaft $d'\ d'$, in the manner and for the purpose hereinabove set forth.

In testimony that the foregoing is a true description of my said invention I have hereto set my signature this 7th day of August, A. D. 1848.

JOHN P. HAYES.

Witnesses:
   EZRA LINCOLN, Jr.,
   LUTHER BRIGGS, Jr.